United States Patent [19]
Walker

[11] Patent Number: 5,209,440
[45] Date of Patent: May 11, 1993

[54] HEXAGONAL JUNCTION ADAPTER WITH RETAINING SHOULDER

[75] Inventor: William R. Walker, Rochester, Mich.

[73] Assignee: Hydro-Craft, Inc., Rochester Hills, Mich.

[21] Appl. No.: 733,344

[22] Filed: Jul. 22, 1991

[51] Int. Cl.$^5$ .............................................. F16L 3/22
[52] U.S. Cl. ..................................... 248/68.1; 285/61; 285/137.1
[58] Field of Search ............................. 285/61, 137.1; 248/68.1

[56] References Cited

U.S. PATENT DOCUMENTS

| | | |
|---|---|---|
| 2,359,846 | 10/1944 | Hayman . |
| 3,254,399 | 6/1966 | Zahuranec . |
| 3,397,431 | 8/1968 | Walker . |
| 3,414,220 | 12/1968 | Walker . |
| 4,363,337 | 12/1982 | Pease ................................ 285/61 X |
| 4,878,696 | 11/1989 | Walker . |
| 5,098,047 | 3/1992 | Plumley ............................. 248/68.1 |

OTHER PUBLICATIONS

Parker Fluid Connectors Catalog No. 4350, Dec. 1984.

*Primary Examiner*—Dave W. Arola
*Attorney, Agent, or Firm*—Harness, Dickey & Pierce

[57] ABSTRACT

A one-piece hexagonal junction adapter for use in a conventional plural line clamping system that generally comprises two opposed U-shaped channels having semi-cylindrical collar portions for supporting the junction adapters and stacking nuts which are disposed between the channels and help secure and separate adjacent adapters. The axial thickness of the hexagonal body portion of the junction adapter of the present invention is substantially equal to the width of or distance between the opposed interior side walls of the U-shaped channels. The junction adapter has two retaining shoulder portions, each located between the body and one of the two cylindrical collar support portions that engage the semi-cylindrical collar portions of the channels. These features enable the junction adapter to fit more securely within the plural line clamping system and provide greater resistance to movement due to forces resulting from extremely high fluid line pressures.

3 Claims, 2 Drawing Sheets

HEXAGONAL JUNCTION ADAPTER WITH RETAINING SHOULDER

BACKGROUND OF THE INVENTION

The present invention relates to an improved junction adapter for use with a conventional plural line clamping system in which the adapter has a hexagonally shaped body and is formed from hexagonal bar stock.

Plural line clamping systems are widely used in the hydraulics industry whenever it is necessary to connect plural fluid lines to a machine. Such a clamping system provides a mounting device for holding the junction adapters that connect the fluid lines from the machine to the fluid lines heading to the source of fluid power. The plural line clamping system provides a secure mount for fluid line junction adapters over a wide range of fluid line pressures that resists the forces tending to cause the junction adapter to shake loose or rattle. Plural line clamping systems are disclosed in U.S. Pat. Nos. 3,397,431, 3,414,220, and 4,878,696, all issued in the name of William R. Walker and assigned to the assignee of present invention, namely, Hydro-Craft, Inc., of Rochester Hills, Mich. These patents, which also show prior art junction adapters, are hereby incorporated by reference.

Since their introduction, plural line clamping systems such as those available from Hydro-Craft, Inc. and sold under the trademark "MULTI-CLAMP", have become quite popular and are widely used in the machine tool industry to route and secure hydraulic and pneumatic piping, tubing and other lines in an orderly, neat and efficient manner. The plural line clamping system in general provides a simple and sturdy mount for the junction adapters and is widely used in almost any hydraulics application where it is necessary to have plural fluid lines. There are currently several tens of thousands of MULTI-CLAMP ® installations in use in the United States and other countries, and MULTI-CLAMP ® assemblies in several standard sizes have been sold for years by the assignee.

The basic arrangement of a common plural line clamping system can be seen from reviewing the above-cited patents or by reviewing the prior art FIGS. 1 and 2. As can be seen in FIG. 1, a metal plural line clamping assembly 20 in general includes a stamped U-shaped top channel 22 and an opposed stamped U-shaped bottom channel 24. Of course, the channels could also be disposed vertically, in which case there would be right and left channels. The channels 22, 24 are formed with semi-cylindrical collars 26, 28 that support prior art junction adapters 30 at cylindrical collar support portions 32 formed on the junction adapter 30. It will be understood that the assembly shown in FIG. 1 is for example only and that there could be additional sets of semi-cylindrical collars 26, 28 further along the channel members 22, 24. As can be seen from the prior patents, the plural line clamping system 20 will typically have four to ten or more sets of semi-cylindrical collars 26, 28 with each collar set being adapted to mount a junction adapter 30. The prior art junction adapters 30 are formed having a hexagonal body portion 34, cylindrical collar support portions 32, and cylindrical portions 36. As shown in FIG. 1, even though the hexagonal body portions 34 within any one plural line clamping assembly are the same over-all size and the collar support portions 32 are the same size, the cylindrical portions 36 need not be the same size.

The hexagonal body portion 34 of each junction adapter 30 fits into the U-shaped channels 22, 24 and acts as a central support portion. Between the hexagonal body portion 34 and each cylindrical portion 36 is a collar support portion 32. Each cylindrical portion 36 has a threaded portion 38 formed on its outer surface. The junction adapter 30 is formed from a common piece of hexagonal bar stock. A fluid passage 40 passes through the entire extent of the junction adapter 30 and acts to create a passageway for fluid passing through lines sealingly connected to either cylindrical portion 36 of the junction adapter 30 and running to a machine actuator from a source of power, a control valve, or the like.

Cylindrical stacking nuts 42 having a predetermined length extend between the channels 22, 24 to separate the channels 22, 24 and secure each junction adapter 30 within the plural line clamping assembly 20, as is explained more fully below. Bolts 44 extend through holes 46 formed in the channels 22, 24 and are secured in screw thread holes 48 within the stacking nuts 42, as shown in FIGS. 1 and 2, to lock the channel members 22, 24 together and rigidly secure the junction adapters 30 within the plural line clamping assembly 20.

The hexagonal body portion 34 of each prior art junction adapter 30 fits within the plural line clamping assembly 20 between the channel members 22, 24 and stacking nuts 42. The junction adapter 30 forms line contacts at locations 50 between two opposed edges of the hexagonal body portion 34 and the channel members 22, 24. In addition, there is plane contact with the stacking nuts 42 along two opposed sides 52 of the hexagonal body portion 34. Since the hexagonal body portion 34 of each prior art junction adapter 30 has six equal faces or sides, an assembler merely needs to place the junction adapter 30 into the channel members 22, 24 and insert the bolts 44 into stacking nuts 42. Any two opposed sides 52 of the six sides of the junction adapter 30 can be oriented along the stacking nuts 42.

However, it can be seen in FIG. 2 that the hexagonal body portion 34 of the prior art hexagonal junction adapter 30 has an axial thickness T that is less than the width W between the opposed interior side walls of the channels 22, 24. Further, the cylindrical collar support portions 32 are formed at right angles to the hexagonal body portion 34 as shown at location 56. Therefore, a gap exists between the axial sides of the hexagonal body portion 34 of the junction adapter 30 and the channels 22, 24 which, at extremely high fluid line pressures, may allow the junction adapter 30 to shift its position within the clamping system 20.

The entire hexagonal junction adapter 30 of the prior art can be made out of commonly available hexagonal bar stock using standard automatic screw machines. Any suitable material can be used such as 1008 or 1010 mild steel. Hexagonal bar stock is readily available in a variety of SAE standard sizes that will correspond to the dimensions needed to have the hexagonal body portion 34 of the junction adapter 30 fit into the various sizes of channels 22, 24 of the plural line clamping systems 20. In other words, it is not necessary to machine the exterior surfaces, that is the sides 52, of the hexagonal body portion 34. For example, in making the prior art junction adapter 30, the hexagonal bar stock is machined in order to form the cylindrical collar support portions 32 and drilled ot to form the fluid passage 40.

A threaded portion 38 is then formed on the two cylindrical portions 36.

Although the plural line clamping systems 20 shown in the prior patents have been very successful, there are some limitations. That is, there is an upper limit to the range of fluid line pressures over which the plural line clamping system 20 can operate. In particular, fluid line systems which have extremely high fluid line pressures may generate forces on the junction adapter 30 which may tend to cause the junction adapter 30 to shake or rattle in a plural line clamping system 20.

A necessary feature for any new plural line clamping system junction adapter is that it must be a retrofit into the existing plural line clamping systems. There are currently several tens of thousands of MULTI-CLAMP ® installations in service in the United States and other countries, and each includes several collar pairs each supporting an adapter. Also, the manufacturer of MULTI-CLAMP ® assemblies, its distributors and a number of their larger customers each maintain a substantial inventory of MULTI-CLAMP ® systems or assemblies. In addition, conventional plural line clamping assemblies come in several different standard sizes of channels, with each different size channel requiring a different size body or central support section. To change the dimensions of the conventional plural line clamping assemblies would require tooling changes for each such size channel amounting to several millions of dollars for each different size. Thus, any new adapter must either fit into the existing plural line clamping assemblies or it will not be successful in the marketplace. It is not realistic to expect the industry to replace completed design or existing plural line clamping assemblies just in order to accommodate a new improved junction adapter.

In light of the foregoing discussion, it is a principal object of the present invention to provide a high quality one-piece junction adapter for use within a conventional plural line clamping system that improves the performance of the clamping system by enabling the clamping system to increase the upper limit on the range of fluid line pressures over which it may be successfully used. In particular, it is an important object to provide a junction adapter for a plural line clamping system that provides greater resistance to the forces resulting from extremely high fluid line pressures which tend to shake or rattle the junction adapter and thereby cause noise or further vibrations in the plural line clamping system.

SUMMARY OF THE INVENTION

The foregoing objects are achieved by an improved one-piece hexagonal junction adapter of the present invention. This improved junction adapter is designed for use in a conventional plural line clamping system that generally comprises two opposed U-shaped channels having semi-cylindrical collar portions for supporting the junction adapters and stacking nuts which are disposed between the channels and help secure and separate adjacent junction adapters. The axial thickness of the hexagonal body portion of the junction adapter of the present invention is equal to the distance (i.e., for width) between the opposed interior side walls of the U-shaped channels and the diameter of the cylindrical collar support portions equals the diameter encompassed by opposed semi-cylindrical collar portions of the channels. Further, the junction adapter is provided with two retaining shoulder portions, each located between the body portion and one cylindrical collar support portion and which each conform to a corresponding radiused surface present for years on the inside edge of the semi-cylindrical collar portions of the channels. These features enable the junction adapter to fit more securely within the plural line clamping system and provide greater resistance to any movement which might otherwise be caused by the forces resulting from extremely high fluid line pressures. As previously noted, such forces, if sufficiently high, tend to shake or rattle the junction adapter. This improvement to the construction of the junction adapter allows the clamping system to increase the upper limit on the range of fluid line pressures over which it may successfully operate.

These and other features and objects of the present invention can be best understood when read in conjunction with the attached specification and drawings.

DETAILED DESCRIPTION OF THE PREFERRED EMBODIMENT

Figure 1:
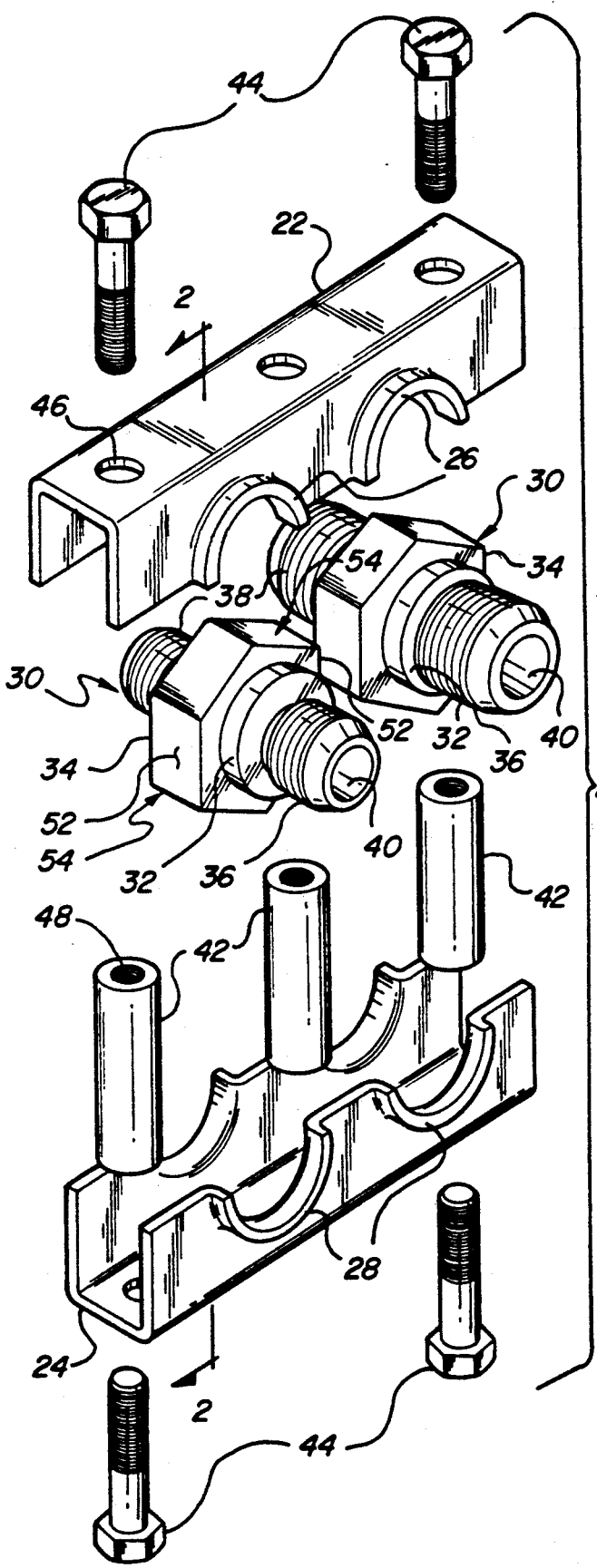
FIG. 1 is an exploded perspective view of a portion of a conventional plural line clamping system or assembly for clamping up two prior art junction adapters shown therewith.
Figure 2:
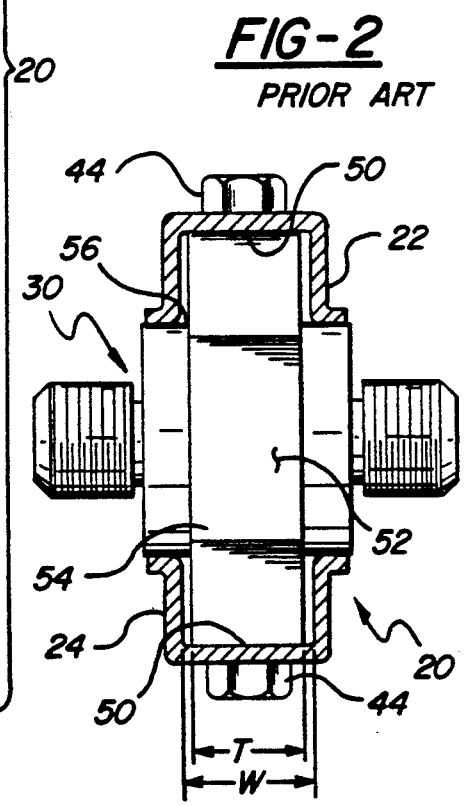
FIG. 2 is a cross-section along line 2—2 through the plural line clamping system shown in FIG. 1, when it is assembled, illustrating the placement of one of the prior art junction adapters in the plural line clamping system.
Figure 3:
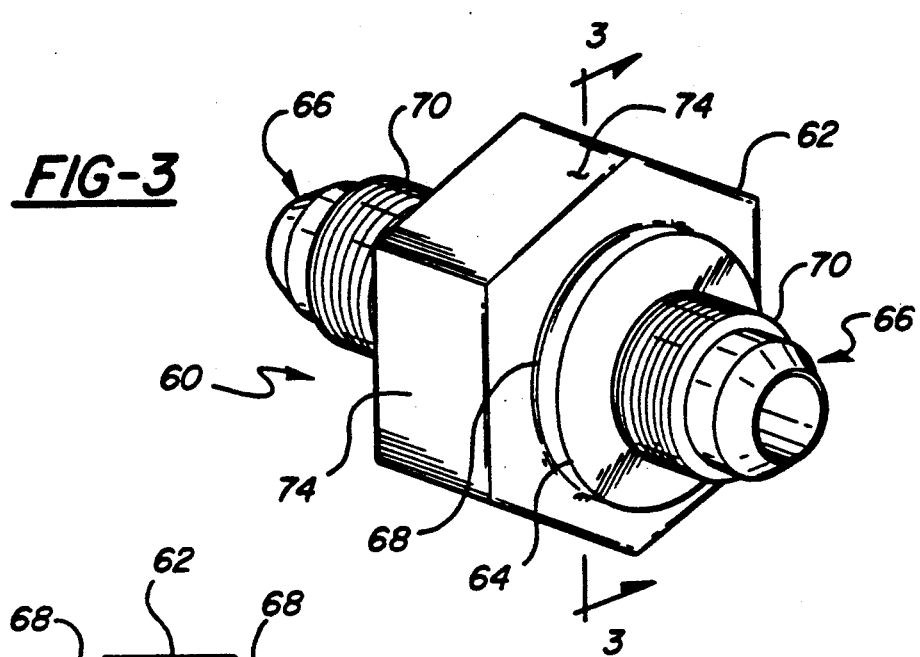
FIG. 3 is a perspective view of a first embodiment of the junction adapter of the present invention.
Figure 4:
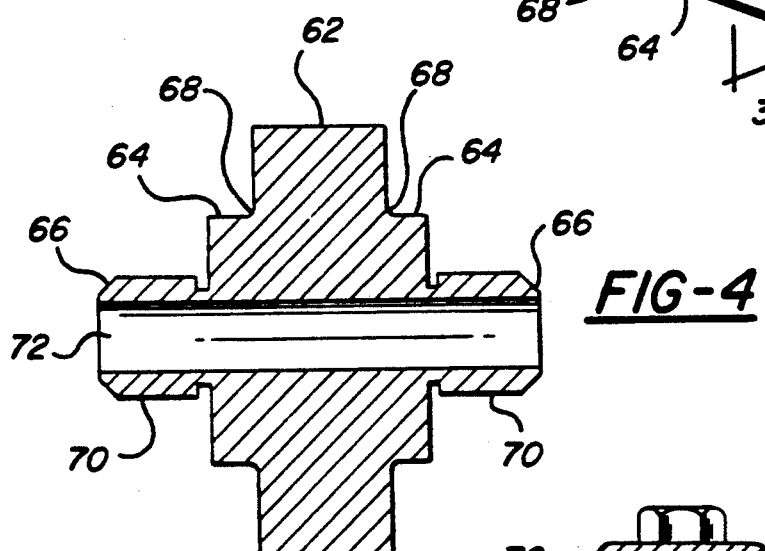
FIG. 4 is a side elevational view of the junction adapter of the present invention, shown in cross-section along line 3—3 of FIG. 3.
Figure 5:
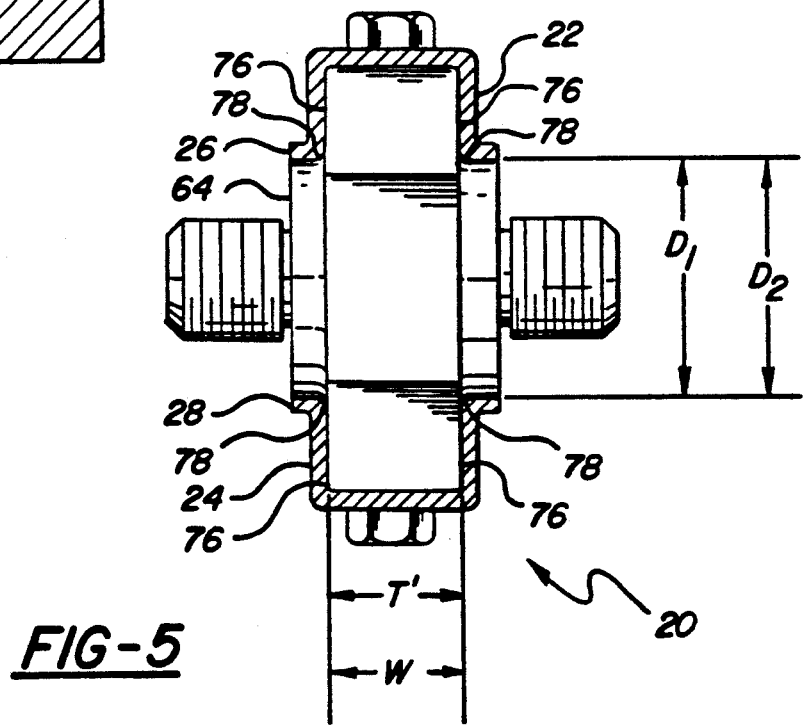
FIG. 5 is a cross-sectional view similar to FIG. 2, but showing the junction adapter of the present invention within the plural line clamping assembly.

The present invention can be understood upon consideration of FIGS. 3, 4 and 5. As shown in FIG. 3, the present invention is a junction adapter 60 that generally comprises a hexagonal central support portion 62, two cylindrical collar support portions 64, one on each axial side of the central support portion 62, and two cylindrical threaded connection portions 66, each disposed next to the collar portions 64 on the sides thereof opposite of the central support portion 62. In addition, the junction adapter 60 includes two retaining shoulder portions 68, each one located between the central support portion 62 and one of the cylindrical collar support portions 64.

As shown in FIG. 4, the junction adapter 60 has, reading left to right, a first threaded connection portion 66, a first collar support portion 64, a first retaining shoulder portion 68, the central support portion 62, a second retaining shoulder portion 68, a second collar support portion 64, and a second threaded connection portion 66. Male threads are shown formed at locations 70 and are an integral part of the threaded connection portions 66 and a fluid passage 72 extends through the entire axial extent of the adapter member 60. All six sides 74 of the central support portion 62 of the hexagonal junction adapter 60 are of equal size and each intermediate angle between adjacent sides 74 is also equal.

As best shown in FIG. 5, the junction adapter 60 is designed to be and is snugly captured within the plural line clamping assembly 20 between the two channel members 22, 24 and adjacent stacking nuts 42. The hexagonal central support portion may be sized as shown to form line contacts with the channel members 22, 24 and plane contacts with the stacking nuts 42 along opposed sides of the central support portion 62 as was described earlier. The axial thickness T' of the central support portion 62 is equal to the width W which is the distance between the opposed interior side walls of the "U" formed by each of the channel members 22, 24. Given this snug fit, the channel members 22, 24 act to securely constrain the junction adapter 60 in the axial direction when the junction adapter 60 is installed in the clamping system 20. It is to be understood that the central support portion 62 of the junction adapter 60 is not only captured at all four locations as described above, but also that the channel members form plane contacts at locations 76 with the central support portion 62.

As illustrated in FIG. 5, the diameter D1 of each collar support portion 64 is equal to the diameter D2 encompassed by the opposed semi-cylindrical collar portions 26, 28 formed in the channels 22, 24, as is also found in the earlier line clamping systems from the assignee or the present invention. However, unlike the earlier line clamping systems, junction adapter 60 also includes two retaining shoulder portions 68. Each portion 68 is designed to abut the radius formed in the channel members 22, 24 about their semi-cylindrical collar portions 26, 28 as shown at locations 78 when the junction adapter 60 is installed in the clamping system 20. In other words, each shoulder portion 68 includes a radiused surface which is complementary to and snugly fits against the adjoining radiused surface, which has long been included on the channels 22, 24. For the Hydro-Craft Multi-Clamp HC-10 series junction adapter, the radius of the retaining shoulder portion is preferably about 0.080 inch.

The junction adapter 60 of the present invention can be made out of commonly available hexagonal bar stock using standard automatic screw machines. Any suitable material can be used such as 1008 or 1010 mild steel. Hexagonal bar stock is readily available in a variety of SAE standard sizes that will correspond to the dimensions needed to have the central support section 62 of the junction adapter 60 fit into the various sizes of channels 22, 24 of the plural line clamping systems 20. In other words, it is not necessary to machine the exterior flat surfaces, that is the sides 74, of the central support portion 62. The junction adapter 60 is formed by first turning the hexagonal bar stock to remove material so as to leave the cylindrical collar support portions 64 and the retaining shoulder portions 68. The bar stock is then turned to remove additional material in the area of the threaded connection portions 66. Threads are then formed at locations 70 of the threaded connection portions 66 and the fluid passage 72 is bored or drilled out.

Further details as to the techniques used to machine the junction adapter 60 need not be given here, since they would be readily apparent to any one of ordinary skill in automatic screw machine art. Once the junction adapter 60 has been completely formed, it is then preferably cadmium-plated or zinc-plated for corrosion protection, using well-known plating techniques. By these methods, a one-piece junction adapter of the present invention is economically obtained.

Only one working embodiment of the present invention has been disclosed. However, a worker in the art would realize that a number of modifications may be made and would still be within the scope of this invention. For example, two alternative embodiments are disclosed in commonly assigned U.S. Pat. No. 4,878,696, in FIGS. 3A and 6A thereof, which include hexagonal portions on the sides of the cylindrical collar support portions opposite the central support portion of junction adapters. These same type of the hexagonal portions could be employed with hexagonal junction adapter 60 of the present invention. In addition, any combination of conventional or suitable male or female threads could be used on the threaded connection portions 66 of the junction adapter 60, 37 degree or 45 degree flared fitting connection may also be used. Further, the type of connection means used are not limited to threaded connectors but could include any other style of connector presently known or later developed, as may be required or desired to connect up the fluid lines. The intended scope of the present invention can best be understood by consideration of the appended claims, including all fair equivalents thereof.

I claim:

1. A junction adapter for a plural line clamping assembly of the type having (1) a plurality of channels each of generally U-shaped cross-section and each provided with two leg sections and a connecting section therebetween, said leg sections having interior wall surfaces separated by a predetermined distance, said leg sections provided with semi-cylindrical collar portions formed in said leg sections at the outermost extent thereof, said collar portions each including a semi-cylindrical surface and a radiused surface extending between the semi-cylindrical surface and an adjoining interior wall surface, (2) stacking nut means, disposed between and for separating said channels in a position such that the U-shapes of said channels face each other and pairs of semi-cylindrical collar portions oppose each other encompass a diameter, and (3) bolt means extending through said channel members and into engagement with said stacking nuts for causing said channel members to bear against said stacking nut means, said adapter comprising:

a hexagonally-shaped central support portion sized to span said predetermined distance between said leg sections and to be received snugly within said channels, whereby said central support portion generally abuts said leg sections thereof;

two cylindrical collar support portions each formed radially smaller than said central support portion and each located at an opposite axial side thereof and sized to span the diameter encompassed by one pair of the opposed semi-cylindrical collar portions and adapted to be received therebetween;

two retaining shoulder portions one positioned between the central support portion and a first of the cylindrical collar support portions and the other positioned between the central support portion and a second of the cylindrical collar support portions, said retaining shoulder portions forming radiused surfaces operable to fit snugly against the radiused surfaces of a pair of the semi-cylindrical collar portions such that the adapter is more rigidly secured between the leg sections within the clamping assembly against movement in an axial direction; and two connection portions each located at the end of said collar support portions opposite said central support portion and provided with connector means to sealingly receive a fluid line connection, and wherein said central support portion, said collar support portions, and said connection portions are formed from a single piece of hexagonal bar stock material, and have a common fluid passage extending therethrough, whereby, when said junction adapter is installed in said plural line clamping assembly and said bolt means are tightened into said stacking nut members, said junction adapter is captured and snugly secured between said stacking nut means and the radiused surfaces of said channel members to secure the junction adapter against movement in any direction including an axial direction.

2. An adapter as recited in claim 1, wherein each said connector means includes male threads formed on and constituting an integral part of its respective connection portion.

3. A plural line clamping assembly comprising:

first and second channel members, each said channel member being of generally U-shaped cross-section and having two leg sections and a connecting section therebetween, said leg sections having interior walls separated by a predetermined distance, and each leg section being provided with semi-cylindrical collar portion formed at the outermost extent thereof that includes a substantially semi-cylindrical surface and a radiused surface interconnecting the semi-cylindrical surface to the interior wall of said leg section, said first and second channel members being adapted to be aligned and secured to each other in a position whereby the U-shapes of said channel members face each other and whereby pairs of semi-cylindrical collar portions oppose each other, with each such pair defining a diameter;

at least two elongated stacking nut members of a common first length being disposed generally within the U-shaped channels of said first and second channel members and extending between said channel members, said stacking nuts being located on each side of said semi-cylindrical collar portions of said channel members, and each stacking nut being spaced from the next adjacent stacking nut by a second length;

a junction adapter being formed with a central support portion of hexagonal cross-section and sized to be received within said U-shaped cross-sections of said first and second channel members and span substantially the entire predetermined distance, said adapter being received between and abutting said leg sections of said channel members and said adjacent stacking nut members and being dimensioned so that the distance between two opposed points on said hexagonal junction adapter is substantially equal to said first length and the distance between any two opposed faces of said hexagonal junction adapter is equal to said second length, and having a fluid passage extending axially through the entire length of said adapter; and bolt members extending through said first and second channel members and into engagement with said stacking nuts to cause said channel members to bear against and capture said junction adapter between said channel members and said adjacent stacking nut members, said junction adapter being a one-piece member formed with cylindrical collar portions and retaining shoulder portions on both axial sides of said central support portion, said semi-cylindrical collar and retaining shoulder portions being radially smaller than the central support section, said collar being sized to span said diameter encompassed by said semi-cylindrical collar portions, said retaining shoulder portions each being disposed between a respective one of the collar portions and said central support portion, with each retaining shoulder portion including a radiused surface that abuts snugly against one of the radiused surfaces of the collar support portions of the channel members such that the junction adapter is more rigidly secured between the leg sections within the clamping assembly against movement in an axial direction, and said junction adapter also being formed with threaded connection portions at each axial side of said collar portions opposite said central support portion.

* * * * *

UNITED STATES PATENT AND TRADEMARK OFFICE
CERTIFICATE OF CORRECTION

PATENT NO. : 5,209,440
DATED : May 11, 1993
INVENTOR(S) : W. Walker

It is certified that error appears in the above-indentified patent and that said Letters Patent is hereby corrected as shown below:

Title page :
Column 2, line 7, Abstract, after adjacent insert --junction--.

Column 2, line 68, replace "ot" with --out--.

Column 6, line 64, after "of" insert --one of--.

Signed and Sealed this

Twenty-eight Day of February, 1995

Attest:

BRUCE LEHMAN

*Attesting Officer*    *Commissioner of Patents and Trademarks*